(12) United States Patent
Ashrafi

(10) Patent No.: US 9,036,459 B2
(45) Date of Patent: May 19, 2015

(54) RECTANGULAR POWER SPECTRAL DENSITIES OF ORTHOGONAL FUNCTIONS

(75) Inventor: Ashkan Ashrafi, San Diego, CA (US)

(73) Assignee: SAN DIEGO STATE UNIVERSITY RESEARCH FOUNDATION, San Diego, CA (US)

( * ) Notice: Subject to any disclaimer, the term of this patent is extended or adjusted under 35 U.S.C. 154(b) by 916 days.

(21) Appl. No.: 13/256,512

(22) PCT Filed: Mar. 15, 2010

(86) PCT No.: PCT/US2010/027369
§ 371 (c)(1),
(2), (4) Date: Nov. 23, 2011

(87) PCT Pub. No.: WO2010/107717
PCT Pub. Date: Sep. 23, 2010

(65) Prior Publication Data
US 2012/0120787 A1    May 17, 2012

Related U.S. Application Data

(60) Provisional application No. 61/160,323, filed on Mar. 15, 2009, provisional application No. 61/314,142, filed on Mar. 15, 2010.

(51) Int. Cl.
*H04J 11/00*    (2006.01)
*H04B 1/717*    (2011.01)

(52) U.S. Cl.
CPC .................................. *H04B 1/7172* (2013.01)

(58) Field of Classification Search
CPC .................................................. H04B 1/7172
USPC ........................................................ 370/208
See application file for complete search history.

(56) References Cited

U.S. PATENT DOCUMENTS

| | | | |
|---|---|---|---|
| 7,020,194 B2 | 3/2006 | Sim et al. | |
| 7,486,742 B2 | 2/2009 | Santhoff | |
| 8,111,332 B2* | 2/2012 | Kimura et al. | 348/622 |
| 2002/0077817 A1* | 6/2002 | Atal | 704/254 |
| 2003/0076990 A1* | 4/2003 | Brand | 382/154 |
| 2005/0164663 A1* | 7/2005 | Santhoff et al. | 455/226.1 |
| 2008/0137717 A1 | 6/2008 | Lee | |
| 2009/0117916 A1* | 5/2009 | Jo | 455/456.1 |
| 2009/0225994 A1* | 9/2009 | Topchy et al. | 381/56 |
| 2010/0008424 A1* | 1/2010 | Pace | 375/240.16 |
| 2010/0124290 A1* | 5/2010 | Kablotsky | 375/259 |

* cited by examiner

*Primary Examiner* — Shripal Khajuria
*Assistant Examiner* — Faisal Choudhury
(74) *Attorney, Agent, or Firm* — Todd L. Juneau

(57) ABSTRACT

In this application, a set of orthogonal functions is introduced whose power spectral densities are all rectangular shape. To find the orthogonal function set, it was considered that their spectrums (Fourier transforms of the functions) are either real-valued or imaginary-valued, which are corresponding to even and odd real-valued time domain signals, respectively. The time domain functions are all considered real-valued because they are actually physical signals. The shape of the power spectral densities of the signals are rectangular thus, the Haar orthogonal function set can be employed in the frequency domain to decompose them to several orthogonal functions. Based on the inverse Fourier transform of the Haar orthogonal functions, the time domain functions with rectangular power spectral densities can be determined. This is equivalent to finding the time-domain functions by taking the inverse Fourier transform of the frequency domain Walsh functions. The obtained functions are sampled and truncated to generate finite-length discrete signals. Truncation destroys the orthogonality of the signals. The Singular Value Decomposition method is used to restore the orthogonality of the truncated discrete signals.

8 Claims, 10 Drawing Sheets

RECTANGULAR POWER SPECTRAL DENSITIES OF ORTHOGONAL FUNCTIONS

CROSS REFERENCE TO RELATED APPLICATIONS

This application claims priority benefit under 35 USC 119 (e) to U.S. provisional application Ser. No. 61/160,323, filed 15 Mar. 2009, the contents of which are incorporated herein in their entirety, and to U.S. provisional application Ser. No. 61/314,142, filed 15 Mar. 2010, the contents of which are incorporated herein in their entirety.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT n/a

BACKGROUND

1. Field of the Invention

This invention relates to transmission and receiving of digital communications, and particularly to the generation of an orthogonal function set that makes transmission of several communication channels over an allocated frequency band possible. The orthogonal signal set is defined based on the Haar orthogonal functions in the frequency domain. The discrete version of the functions are generated by sampling and truncation the aforementioned signals. The orthogonality of the sampled and truncated signals is restored by the Singular Value Decomposition method.

2. Background of the Invention

Modulation" refers to an operation in which data is converted into a suitable form for transmission by usually carrying the data on a carrier in order to transmit information or data from one point to another point or from a first apparatus to a second apparatus through a communication line or a radio link. After received by the second apparatus, the modulated data is demodulated, that is, is restored to a suitable form to be subsequently used in the second apparatus by removing the carrier.

According to signal waves expressing information to be transmitted, such modulation includes various modulation schemes such as amplitude, frequency and time modulation schemes for a high frequency current or voltage of a sine wave, a periodic pulse or the like.

Orthogonal modulation as one of various modulation schemes is a modulation scheme using an orthogonal code in the modulation, and is characterized in that it is suitable for systems having a limitation on available power because a Signal-to-Noise Ratio (SNR) per bit required for attaining a given bit error rate goes lower as a modulation dimension increases.

Ultra-wideband (UWB) technology provides the potential for delivering a large amount of data with low power spectral density due to modulation of extremely narrow pulses. The spectrum of UWB is about 3.1 GHz to 10.6 GHz and the transmission power is low, about −41 dbm/MHz. The short duration of UWB pulses spreads their energy across a wide range of frequencies from near DC to several GHz and enables UWB signals to share the frequency spectrum with the coexisting narrowband and wideband communication systems. UWB is able to transmit broadband multimedia content over short distances, i.e. 100 feet. Although UWB communications offer a promising solution to an increasingly overcrowded frequency spectrum, sampling/truncation of digital communications destroys orthogonality.

U.S. Pat. No. 6,912,372

BRIEF SUMMARY OF THE INVENTION

Provided herein are methods, apparatuses, and systems for transmitting several pulsed orthogonal signals over one allocated bandwidth while selecting for signals having rectangular power spectrum densities.

In one preferred embodiment, there is provided a method for the high fidelity transmission and reception of several orthogonal electrical pulsed signals over one allocated bandwidth within a system for generating and transmitting signals having a defined pulse shape, comprising: filtering the pulsed signals to select signals that have a rectangular shape power spectral density, wherein the orthogonal function sets are found in the frequency domain, and wherein the orthogonal functions are a Haar orthogonal function set, and restoring orthogonality after truncation or sampling using an SVD orthogonalization process.

In other preferred embodiments, there is provided the methods herein further comprising wherein the pulsed signals are signals of an ultra wideband type, or further comprising wherein the pulsed signals are signals of an orthogonal frequency division multiplexing (OFDM) communication system, or further comprising wherein the pulsed signals are used in a jitter-free digital communication system, or further comprising wherein the orthogonal function for we is described by $$x_{m,k}(t) = \frac{\omega_c}{\pi 2^m} \mathrm{sinc}\left(\frac{\omega_c t}{\pi 2^{m+2}}\right) \sin\left(\frac{\omega_c t}{2^{m+2}}\right) \sum_{n=0}^{2^m-1} \alpha_{m,n,k} \sin\left(\frac{\left(n+\frac{1}{2}\right)\omega_c t}{2^m}\right) \quad (35)$$

and $$y_{m,k}(t) = \frac{\omega_c}{\pi 2^m} \mathrm{sinc}\left(\frac{\omega_c t}{\pi 2^{m+2}}\right) \sin\left(\frac{\omega_c t}{2^{m+2}}\right) \sum_{n=0}^{2^m-1} \alpha_{m,n,k} \cos\left(\frac{\left(n+\frac{1}{2}\right)\omega_c t}{2^m}\right), \quad (36)$$

where $k=0, 2, \ldots, 2^m-1$ and $m=0, 1, 2, \ldots$.

In another preferred embodiment, there is provided herein a communication device for assisting the high fidelity transmission and reception of several orthogonal electrical pulsed signals over one allocated bandwidth, comprising: a generator apparatus for generating and transmitting signals that have a defined pulse shape; a filter to select signals that have a rectangular shape power spectral density, wherein the orthogonal function sets are found in the frequency domain, and wherein the orthogonal functions are a Haar orthogonal function set, and where the SVD orthogonalization process is used to restore orthogonality after truncation or sampling.

In additional preferred embodiments, there is provided the device further comprising wherein the pulsed signals are signals of an ultra wideband type, or further comprising wherein the pulsed signals are signals of an orthogonal frequency division multiplexing (OFDM) communication system, or further comprising wherein the pulsed signals are used in a jitter-free digital communication system, or further comprising wherein the orthogonal function for wc is described by $$x_{m,k}(t) = \frac{\omega_c}{\pi 2^m} \text{sinc}\left(\frac{\omega_c t}{\pi 2^{m+2}}\right) \sin\left(\frac{\omega_c t}{2^{m+2}}\right) \sum_{n=0}^{2^m-1} \alpha_{m,n,k} \sin\left(\frac{\left(n+\frac{1}{2}\right)\omega_c t}{2^m}\right) \quad (35)$$

and $$y_{m,k}(t) = \frac{\omega_c}{\pi 2^m} \text{sinc}\left(\frac{\omega_c t}{\pi 2^{m+2}}\right) \sin\left(\frac{\omega_c t}{2^{m+2}}\right) \sum_{n=0}^{2^m-1} \alpha_{m,n,k} \cos\left(\frac{\left(n+\frac{1}{2}\right)\omega_c t}{2^m}\right), \quad (36)$$

where k=0, 2, . . . , $2^m-1$ and m=0, 1, 2, . . . .

In another preferred embodiment, there is provided a method for performing a orthogonal modulation in a transmitter unit of a digital communication system to identify orthogonal signals having rectangular power spectrum densities for transmission of several signals over one allocated bandwidth, the method comprising the steps of: (a) converting data having a serial bit format into a parallel format to generate parallel input data; (b) inputting the parallel input data into a symbol mapper; (c) orthogonally modulating the parallel input data inputted into the symbol mapper to generate modulated data comprised of orthogonal functions; (d) filtering the modulated data to output encoded data; (e) converting the encoded data into a serial bit format to generate a plurality of baseband pulsed signals; and (f) processing the plurality of pulsed baseband signals to generate a plurality of pulsed transmission signals all having rectangular power spectrum densities.

Additional preferred methods include wherein the orthogonal function set is a Haar orthogonal function set, and restoring orthogonality after truncation or sampling uses an SVD orthogonalization process, or further comprising wherein the orthogonal function set for ωc is described by $$x_{m,k}(t) = \frac{\omega_c}{\pi 2^m} \text{sinc}\left(\frac{\omega_c t}{\pi 2^{m+2}}\right) \sin\left(\frac{\omega_c t}{2^{m+2}}\right) \sum_{n=0}^{2^m-1} \alpha_{m,n,k} \sin\left(\frac{\left(n+\frac{1}{2}\right)\omega_c t}{2^m}\right) \quad (35)$$

and $$y_{m,k}(t) = \frac{\omega_c}{\pi 2^m} \text{sinc}\left(\frac{\omega_c t}{\pi 2^{m+2}}\right) \sin\left(\frac{\omega_c t}{2^{m+2}}\right) \sum_{n=0}^{2^m-1} \alpha_{m,n,k} \cos\left(\frac{\left(n+\frac{1}{2}\right)\omega_c t}{2^m}\right), \quad (36)$$

where k=0, 2, . . . , $2^m-1$ and m=0, 1, 2, . . . .

In another preferred embodiment, there is provided an apparatus for performing a orthogonal modulation in a transmitter unit of a digital communication system to identify orthogonal signals having rectangular power spectrum densities for transmission of several signals over one allocated bandwidth, the apparatus comprising: a serial-to-parallel converter for converting data having a serial bit format to be transmitted by the transmitter unit into a parallel format to generate a plurality of parallel input data; a symbol mapper for receiving the plurality of parallel input data from the serial-to-parallel converter and orthogonally modulating the plurality of parallel input data to generate modulated data comprised of orthogonal functions; a filter for filtering the modulated data to output encoded data; a parallel-to-serial converter for converting the encoded data into a serial bit format to generate a plurality of baseband pulsed signals; and a generator to process the plurality of pulsed baseband signals to generate a plurality of pulsed transmission signals all having rectangular power spectrum densities.

In other preferred embodiments, there is provided apparatuses wherein the orthogonal function set is a Haar orthogonal function set, and restoring orthogonality after truncation or sampling uses an SVD orthogonalization process, or further comprising wherein the orthogonal function set for wc is described by $$x_{m,k}(t) = \frac{\omega_c}{\pi 2^m} \text{sinc}\left(\frac{\omega_c t}{\pi 2^{m+2}}\right) \sin\left(\frac{\omega_c t}{2^{m+2}}\right) \sum_{n=0}^{2^m-1} \alpha_{m,n,k} \sin\left(\frac{\left(n+\frac{1}{2}\right)\omega_c t}{2^m}\right) \quad (35)$$

and $$y_{m,k}(t) = \frac{\omega_c}{\pi 2^m} \text{sinc}\left(\frac{\omega_c t}{\pi 2^{m+2}}\right) \sin\left(\frac{\omega_c t}{2^{m+2}}\right) \sum_{n=0}^{2^m-1} \alpha_{m,n,k} \cos\left(\frac{\left(n+\frac{1}{2}\right)\omega_c t}{2^m}\right), \quad (36)$$

where k=0, 2, . . . , $2^m-1$ and m=0, 1, 2, . . . .

Additional preferred apparatuses include wherein the pulsed signals are signals of an ultra wideband type, or further comprising wherein the pulsed signals are signals of an orthogonal frequency division multiplexing (OFDM) communication system, or further comprising wherein the pulsed signals are used in a jitter-free digital communication system.

DETAILED DESCRIPTION OF THE INVENTION

Figure 1:
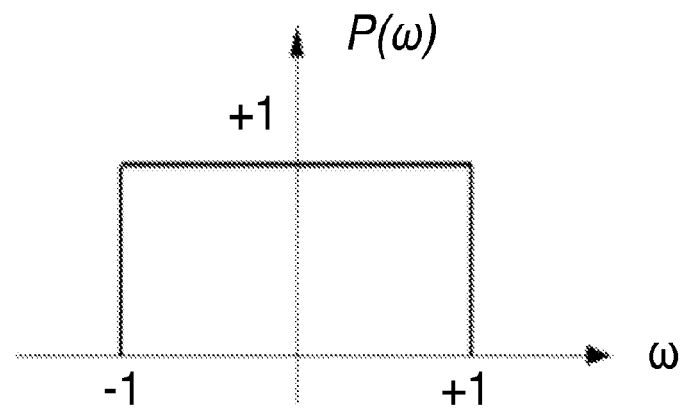
FIG. 1 is a graph of desired power spectral density.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that two or more embodiments of the present invention as presented herein may be combined in whole or in part to form one or more additional embodiments.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "transmitter" and/or "receiver" include(s) transmitters/receivers of cellular and/or satellite terminals with or without a multi-line display; Personal Communications System (PCS) terminals that may include data processing, facsimile and/or datacommunications capabilities; Personal Digital Assistants (PDA) that can include a radio frequency transceiver and/or a pager, Internet/Intranet access, Web browser, organizer, calendar and/or a Global Positioning System (GPS) receiver; and/or conventional laptop and/or palmtop computers or other appliances, which include a radio frequency transceiver. As used herein, the term "transmitter" and/or "receiver" also include(s) any other radiating device, equipment and/or source that may have time-varying and/or fixed geographic coordinates and/or may be portable, transportable, installed in a vehicle (aeronautical, maritime, or land-based) and/or situated/configured to operate locally and/or in a distributed fashion at any location(s) on earth, vehicles (land-mobile, maritime and/or aeronautical) and/or in space. A transmitter and/or receiver also may be referred to herein as a "terminal". As used herein, the term "space-based" component and/or "space-based" system include(s) one or more satellites and/or one or more other objects and/or platforms (such as airplanes, balloons, unmanned vehicles, space crafts, missiles, etc.) that have a trajectory above the earth at any altitude.

In the present inventive subject matter, a set of orthogonal functions is introduced whose power spectral densities are all rectangular. To find the orthogonal function set, it was considered that their spectrum (Fourier transforms of the functions) are either real-valued of imaginary-valued. Since the functions are all real-valued (they are actually physical signals) their real-valued spectrum are even functions of the frequency and their imaginary-valued spectrum are odd functions of the frequency. The shape of the power spectral densities of the signals are rectangular thus, the Haar orthogonal function set can be employed in the frequency domain to decompose them to several orthogonal functions. Based on the inverse Fourier transform of the Haar orthogonal functions, the time domain functions with rectangular power spectral densities can be determined.

INTRODUCTION

In transmission and reception, orthogonal signals play a very important role. The most obvious orthogonal function sets are created by different modulation techniques. The modulation techniques, such as Amplitude Modulation (AM), Frequency Modulation (FM), etc., suffer from low bandwidths, which are crucial in high fidelity transmission and reception necessary in modern communication systems. In many applications, we need signals with rectangular shape power spectral density (PSD), which is the magnitude square of the Fourier transform. This is possible by using sinc shape signal whose spectrum has rectangular shape. But, to transmit several signals over one allocated bandwidth, we need several orthogonal signals whose power spectral densities are all rectangular shape, i.e., occupying the entire allocated spectrum.

Most of the attempts to find orthogonal signals with the same power spectral density (PSD), in general (and rectangular PSD in particular), made in the time domain. There are numerous sources of orthogonal functions to consider such as Chebyshev polynomials, Legendre polynomials, Hermite polynomials etc. However, none of the aforementioned orthogonal signal sets gives us a rectangular power spectral density. Therefore, we shift our focus to the frequency domain and try to solve the problem from the bottom up.

There are numerous applications for orthogonal signals with rectangular shape PSD such as Pulse Shape Modulation (PSM) Ultra-Wide Band and OFDM systems [1][11]. First we should reiterate the orthogonality criterion for signals and their Fourier transforms. This relationship can be established by the Parseval's theorem as follows $$\int_{-\infty}^{+\infty} f(t)g^*(t)dt = \int_{-\infty}^{+\infty} f(\omega)d\omega = 0, \quad (1)$$

where $g^*(\omega)$ indicates the complex conjugate of $g(\omega)$.

Therefore, the definition of orthogonality is the same for two signals in both time domain and frequency domain. Now we can use this concept and try to find the desired orthogonal signals in the frequency domain by solving the following problem.

Figure 2:
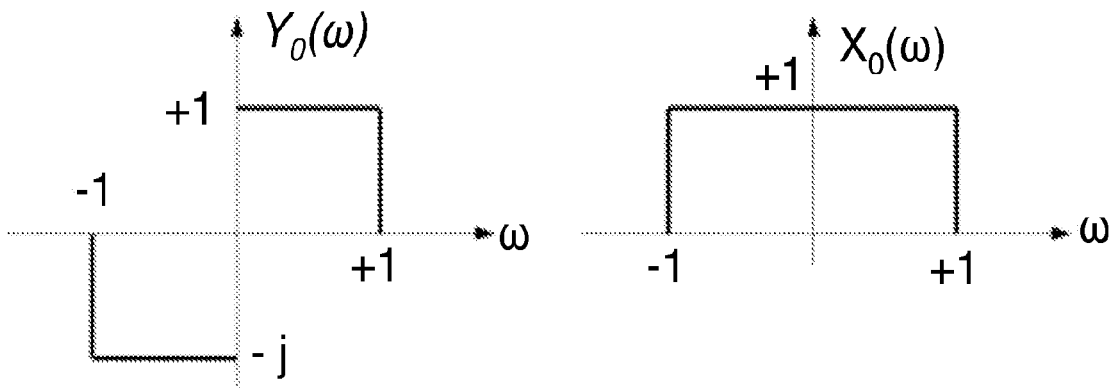
FIG. 2 is a graph of a solution to the problem.

Problem: Find all possible orthogonal functions of $\omega$ whose power spectral densities are all the same as the function $P(\omega)$ defined as (FIG. 1). FIG. 2 shows the obvious solutions to the problem $$P(\omega) = \begin{cases} 1 & -1 \leq \omega \leq +1 \\ 0 & \text{otherwise,} \end{cases} \quad (2)$$

provided that the inverse Fourier transforms of the obtained orthogonal functions are real-valued.

The immediate conclusion from the problem is that the desired functions must be either even or odd because their inverse Fourier transforms must be real-valued functions [12]. The most obvious solutions to the above problems are $$Y_0(\omega) = \begin{cases} -j & -1 \leq \omega < 0 \\ +j & 0 \leq \omega \leq +1 \\ 0 & \text{otherwise,} \end{cases} \quad (3)$$

And $$X_0(\omega) = P(\omega), \quad (4)$$

because $|X_0(\omega)|^2 = |Y_0(\omega)|^2 = |P(\omega)|^2 = P(\omega)$. FIG. 2 illustrates the functions $X_0(\omega)$ and $Y_0(\omega)$. Note that the above functions are discontinuous thus they inverse Fourier transforms are square-summable functions. By calculating the inverse Fourier transform of $X_0(\omega)$ and $Y_0(\omega)$, the orthogonal time-domain signals can be found $$x_0(t) = \frac{1}{\pi}\operatorname{sinc}\left(\frac{t}{\pi}\right), \quad (5)$$

And $$y_0(t) = \frac{1}{\pi}\operatorname{cosc}\left(\frac{t}{\pi}\right), \quad (6)$$

where sin c(t)=sin($\pi$t)/($\pi$t) and cos c(t)=1−cos($\pi$t)/($\pi$t). Obviously, $y_0$(t) is the Hilbert transform of $x_0$(t).

By looking closely at FIG. 2, it is not difficult to see that the following function is the constituent of X ($\omega$) and Y ($\omega$)

$$H_0(\omega) = \begin{cases} 1 & 0 \leq \omega \leq 1 \\ 0 & \text{otherwise}, \end{cases} \quad (7)$$

$$X_0(\omega) = H_0(\omega) + H_0(-\omega) \quad (8)$$
$$Y_0(\omega) = j(H_0(\omega) - H_0(-\omega)).$$

Function $H_0(\omega)$ is the first function in the Haar orthogonal function set. The other Haar functions are defined as follows [12]

$$H_{0,0}(\omega) = \begin{cases} 1 & 0 \leq \omega < \frac{1}{2} \\ -1 & \frac{1}{2} \leq \omega \leq 1 \\ 0 & \text{otherwise} \end{cases} \quad (9)$$

$$H_{m,n}(\omega) = H_{0,0}(2^m \omega - n), \quad (10)$$
$$m = 0, 1, 2, \ldots \quad n = 0, 1, \ldots, 2^m - 1.$$

Figure 3:
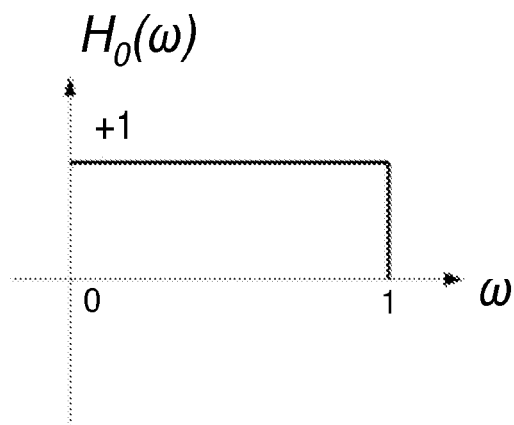
FIG. 3 is a set of 4 graphs showing the first four Haar orthogonal functions.
Figure 3:
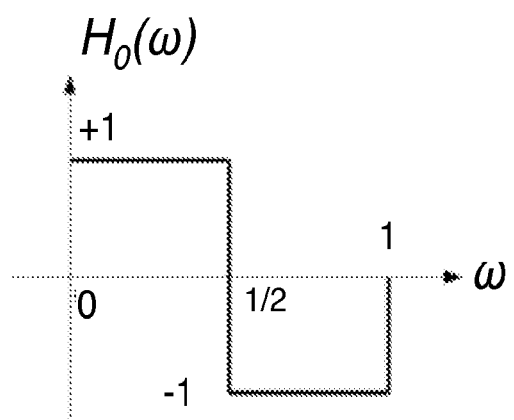
Figure 3:
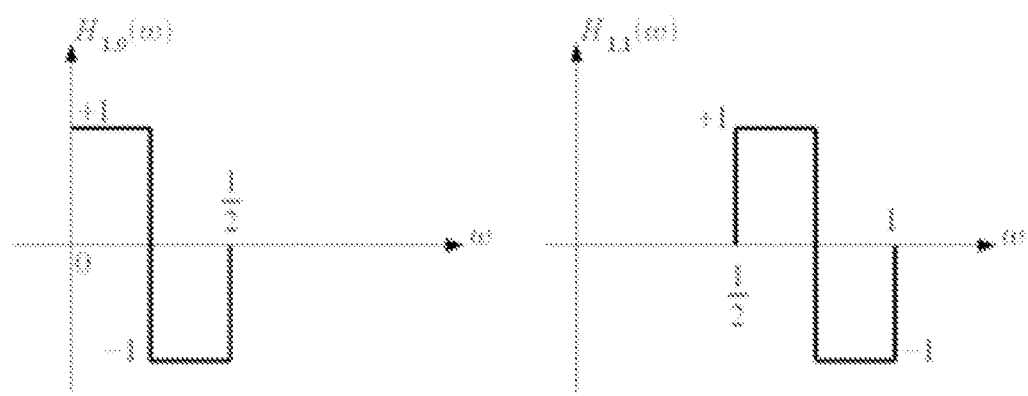

FIG. 3 illustrates the first four Haar orthogonal functions. The inner product of the Haar functions is defined $$\int_0^1 H_{m,n}(\omega) H_{p,q}^*(\omega) d\omega = \begin{cases} 2^{-m} & m = p, n = q \\ 0 & \text{otherwise} \end{cases} \quad (11)$$

As where the orthogonality of the functions is shown [12]. It is worth noting that $H_{m,n}(\omega)$ is a real-valued function thus, $$H_{p,q}^*(\omega) = H_{p,q}(\omega)$$

It can be perceived that the Haar orthogonal function set can be utilized to create orthogonal functions with the rectangular power spectral density. In section II, we will show how this can be done.

2 Using the Haar Orthogonal Function Set

To distinguish between different Haar orthogonal functions we call $H_0(\omega)$ the fundamental Haar function and $H_{m,n}(\omega)$ the nth Haar function of the $m^{th}$ order.

2.1 Motivation Example

FIG. 3 shows an obvious relationship between the Haar fundamental function ($H_0(\omega)$), the 0th Haar function of the 0th order ($H_{0,0}(\omega)$) and the 0th and the 1st Haar functions of the 1st order ($H_{1,0}(\omega)$ and $H_{1,1}(\omega)$)

$$|H_0(\omega)|^2 = |H_{0,0}(\omega)|^2 = |\alpha_{1,0} H_{1,0}(\omega) + \alpha_{1,1} H_{1,1}(\omega)|^2, \quad (12)$$
$$\alpha_{1,0}, \alpha_{1,1} \in \{-1, +1\}.$$

Equation 12 tells us that the linear combination of the Haar functions of the same order, if the coefficients of the linear combination are either +1 or −1, has the magnitude square (power spectral density in the frequency domain) equal to that of the fundamental Haar function. Since the Haar functions are orthogonal, we can generate orthogonal functions whose magnitude squares are rectangular.

2.2 Finding the Orthogonal Functions in the Frequency Domain

Let's define the function $T_{m,k}(\omega)$ as follows $$T_{m,k}(\omega) = \sum_{n=0}^{2^m-1} \alpha_{m,n,k} H_{m,n}(\omega), \quad (13)$$

$$\alpha_{m,n,k} \in \{-1, +1\}, k = 0, 2, \ldots, L-1.$$

where L is an integer number to be determined. Based on the argument in 2.1, it is not difficult to show that $$|T_{m,k}(\omega)|^2 = |H_0(\omega)|^2 = H_0(\omega). \quad (14)$$

Now we have to show that the set of $\{H_0(\omega); T_{m,k}(\omega)\}$ is an orthogonal function set. Obviously $H_0(\omega)$ and $T_{m,k}(\omega)$ are orthogonal functions regardless of the values of $\alpha$'s. To find the condition of orthogonality between $T_{m,k}(\omega)$ functions, we have to make the following integral zero for different values of m, k, p and q $$I = \int_0^1 T_{m,k}(\omega) T_{p,q}^*(\omega) d\omega \quad (15)$$

By using (13) in (15) we can obtain $$I = \sum_{n=0}^{2^m-1} \sum_{s=0}^{2^m-1} \alpha_{m,n,k} \alpha_{p,s,q} \int_0^1 H_{m,n}(\omega) H_{p,s}^*(\omega) d\omega \quad (16)$$

Using (11) in (16) we can find the integral I $$I = \begin{cases} 1 & m = p, k = q \\ 0 & m \neq p \\ 2^{-m} \sum_{n=0}^{2^m-1} \alpha_{m,n,k} \alpha_{m,n,q} & m = p, k \neq q(n = s) \end{cases} \quad (17)$$

In order to make the integral zero at m=p and k≠q, the following summation should be zero $$S = \sum_{n=0}^{2^m-1} \alpha_{m,n,k} \alpha_{m,n,q} \quad (18)$$

Suppose that $\alpha_{m,n,k}$'s and $\alpha_{m,n,q}$'s are the entries of two vectors vm,k and vm,q, respectively. Obviously vm,k and vm,q are 2m 1 vectors whose entries are either +1 or 1

$$V_{m,k} = [\alpha_{m,0,k}, \alpha_{m,1,k}, \ldots, \alpha_{m,2^m-1,k}]^T$$

$$V_{m,q} = [\alpha_{m,0,q}, \alpha_{m,1,q}, \ldots, \alpha_{m,2^m-1,g}]^T$$

$$\alpha_{m,n,k}, \alpha_{m,n,q} \in \{-1, +1\} \quad (19)$$

Therefore, the summation S is in fact the inner product of $v_{m,k}$ and $v_{m,q}$ $$S = (V_{m,k})^T \cdot V_{m,q} \qquad (20)$$

Since S=0, we need to find 2m×1 orthogonal vectors whose entries are either +1 or 1.

This is a classic problem and it has been shown that the columns of the Hadamard matrices satisfy this condition [13].

Hadamard matrices are defined as follows $$W_1 = [1], \; W_2 = \begin{bmatrix} 1 & 1 \\ 1 & -1 \end{bmatrix}, \; W_{2^m} = \underbrace{W_2 \otimes W_2 \otimes \ldots \otimes W_2}_{\text{m-times}} \qquad (21)$$

$$m = 1, 2, \ldots.$$

Where $\otimes$ is the Kronecker product. For example, the 4th and 8th order Hadamard matrices are $$W_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}. \qquad (22)$$

$$W_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

According to (22) the vectors $v_{m,k}$ are the columns of the Hadamard matrix of order $2^m$ and consequently, there are $2^m$ number of them thus, the parameter L mentioned in (13) is equal to $2^m$. Therefore, the orthogonal function set $T_{m,k}(\omega)$ can be represented in terms of $H_{0,0}(\omega)$ using (10) and (13)

$$T_{m,k}(\omega) = \sum_{n=0}^{2^m-1} \alpha_{m,n,k} H_{0,0}(2^m \omega - n), \qquad (23)$$

$$\alpha_{m,n,k} \in \{-1, +1\}, \; k = 0, 2, \ldots, 2^m - 1, \; m = 0, 1, \ldots.$$

The functions $T_{m,k}(\omega)$ are called the Walsh functions [16]. The dyadic order of the Walsh functions is used here [17].

The goal is to find orthogonal functions whose power spectral densities are equal to (1). Using the same analogy given in (7) and (8), we can find the desired orthogonal functions. The set of even orthogonal functions is the Hilbert transform of the set of odd functions $$X_{m,k}(\omega) = [T_{m,k}(\omega) + T_{m,k}(-\omega)], \qquad (24)$$

and the set of odd orthogonal functions is given by $$Y_{m,k}(\omega) = j[T_{m,k}(\omega) - T_{m,k}(-\omega)]. \qquad (25)$$

By substituting (23) into (24) and (25), we can find the even and odd orthogonal functions in terms of $H_{0,0}(\omega)$ $$X_{m,k}(\omega) = \sum_{n=0}^{2^m-1} \alpha_{m,n,k} [H_{0,0}(2^m \omega - n) + H_{0,0}(-2^m \omega - n)], \qquad (26)$$

$$Y_{m,k}(\omega) = j \sum_{n=0}^{2^m-1} \alpha_{m,n,k} [H_{0,0}(2^m \omega - n) - H_{0,0}(-2^m \omega - n)]. \qquad (27)$$

In general, the desired set of orthogonal functions is defined as $$G_{m,k}(\omega) = A X_{m,k}(\omega) + B Y_{m,k}(\omega), \; A^2 + B^2 = 1. \qquad (28)$$

The functions introduced by (26) and (27) are just special cases of (28) for A=1, B=0 and A=0, B=1, respectively. In order to find the corresponding time-domain orthogonal set, we need to find the inverse Fourier transform of $H_{0,0}(\omega)$.

2.3 Finding the Orthogonal Functions in the Time Domain

To find the time domain functions, we should calculate the inverse Fourier transforms of $X_{m,k}(\omega)$, $Y_{m,k}(\omega)$ and $G_{m,k}(\omega)$. It is obvious from (27) and (28) that they are all defined in terms of $H_{0,0}(\omega)$. Therefore, the inverse Fourier transform of $H_{0,0}(\omega)$ should be found first. This can be done by representing $H_{0,0}(\omega)$ in terms of the pulse (rect) function $$H_{0,0}(\omega) = rect\left(\frac{\omega - \frac{1}{4}}{\frac{1}{2}}\right) - rect\left(\frac{\omega - \frac{3}{4}}{\frac{1}{2}}\right) \qquad (29)$$

Using the Fourier transform table [12], it is not difficult to find the inverse Fourier transform of (29)

$$h_{0,0}(t) = \frac{1}{4\pi} \operatorname{sinc}\left(\frac{t}{4}\right) e^{j\frac{1}{4}t} - \frac{1}{4\pi} \operatorname{sinc}\left(\frac{t}{4}\right) e^{j\frac{3}{4}t} = \frac{-j}{2\pi} e^{j\frac{t}{2}} \operatorname{sinc}\left(\frac{t}{4\pi}\right) \sin\left(\frac{t}{4}\right) \qquad (30)$$

Now we can find the inverse Fourier transform of $X_{m,k}(\omega)$ and $Y_{m,k}(\omega)$ in terms of $h_{0,0}(t)$ $$x_{m,k}(t) = \sum_{n=0}^{2^m-1} \alpha_{m,n,k} \left[ 2^{-m} h_{0,0}(2^{-m} t) e^{j2^{-m} nt} + 2^{-m} h_{0,0}(-2^{-m} t) e^{-j2^{-m} nt} \right] \qquad (31)$$

$$y_{m,k}(t) = j \sum_{n=0}^{2^m-1} \alpha_{m,n,k} \left[ 2^{-m} h_{0,0}(2^{-m} t) e^{j2^{-m} nt} - 2^{-m} h_{0,0}(-2^{-m} t) e^{-j2^{-m} nt} \right] \qquad (32)$$

By substituting (30) into (31) and (32), we can obtain the functions $x_{m,k}(t)$ and $y_{m,k}(t)$ $$x_{m,k}(t) = \frac{1}{\pi 2^m} \operatorname{sinc}\left(\frac{t}{\pi 2^{m+2}}\right) \sin\left(\frac{t}{2^{m+2}}\right) \sum_{n=0}^{2^m-1} \alpha_{m,n,k} \sin\left(\frac{\left(n+\frac{1}{2}\right)t}{2^m}\right) \qquad (33)$$

$$y_{m,k}(t) = \frac{1}{\pi 2^m}\operatorname{sinc}\left(\frac{t}{\pi 2^{m+2}}\right)\sin\left(\frac{t}{2^{m+2}}\right)\sum_{n=0}^{2^m-1}\alpha_{m,n,k}\cos\left(\frac{\left(n+\frac{1}{2}\right)t}{2^m}\right) \quad (34)$$

We can generalize the functions for the rectangular spectrum with bandwidth of ωc $$x_{m,k}(t) = \frac{\omega_c}{\pi 2^m}\operatorname{sinc}\left(\frac{\omega_c t}{\pi 2^{m+2}}\right)\sin\left(\frac{\omega_c t}{2^{m+2}}\right)\sum_{n=0}^{2^m-1}\alpha_{m,n,k}\sin\left(\frac{\left(n+\frac{1}{2}\right)\omega_c t}{2^m}\right) \quad (35)$$

Figure 4:
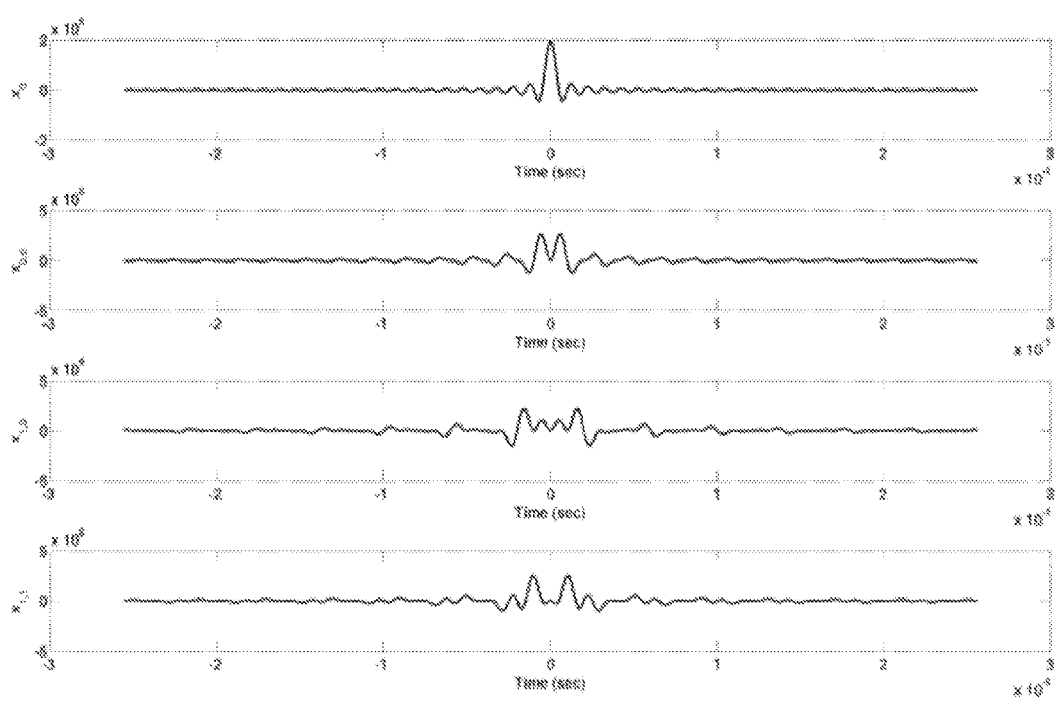
FIG. 4 is a set of 4 line graphs showing functions $x_0(t)$, $x_{0,0}(t)$, $x_{1,0}(t)$ and $x_{1,1}(t)$.

FIG. 4 shows Functions $x_0(t)$, $x_{0,0}(t)$, $x_{1,0}(t)$ and $x_{1,1}(t)$.

$$y_{m,k}(t) = \frac{\omega_c}{\pi 2^m}\operatorname{sinc}\left(\frac{\omega_c t}{\pi 2^{m+2}}\right)\sin\left(\frac{\omega_c t}{2^{m+2}}\right)\sum_{n=0}^{2^m-1}\alpha_{m,n,k}\cos\left(\frac{\left(n+\frac{1}{2}\right)\omega_c t}{2^m}\right) \quad (36)$$

where k=0, 2, ... $2^m-1$
Finally the inverse Fourier transform of $G_{m,k}(\omega)$ can be obtained $$y_{m,k}(t)=Ax_{m,k}(t)+By_{m,k}(t), A^2+B^2=1. \quad (37)$$

It is worth noting that the total number of odd and even signals $x_{m,k}(t)$ and $y_{m,k}(t)$ for a given values of m can be determined by the following formula $$M = 2\left(1+\sum_{r=0}^{m}2^r\right) = 2^{m+2} \quad (38)$$

Figure 5:
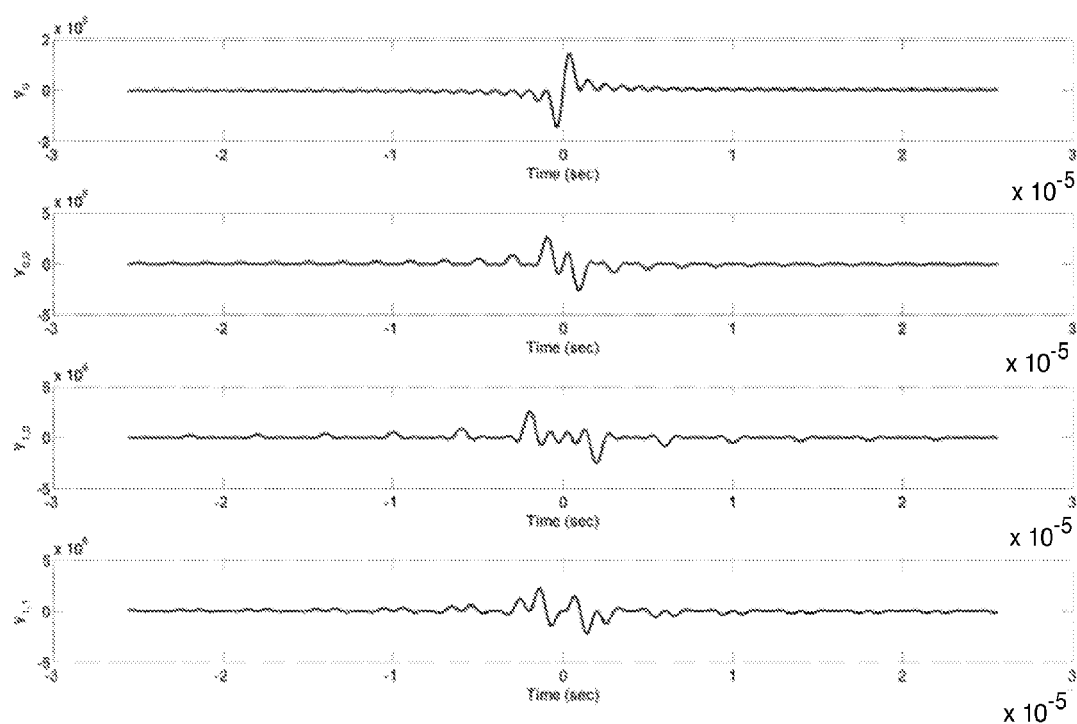
FIG. 5 is a set of 4 line graphs showing functions $y_0(t)$, $y_{0,0}(t)$, $y_{1,0}(t)$ and $y_{1,1}(t)$.

In FIG. 4 the functions $x_0$, $x_{0,0}$, $x_{1,0}$ and $x_{1,1}$ and in FIG. 5 the functions $y_0$, $y_{0,0}$, $y_{1,0}$ and $y_{1,1}$ are shown, respectively.

3 Sampling the Generated Signals

In most applications, we need finite length discrete-time signals that can be obtained by sampling and truncating the signals. Unfortunately, truncation will ruin the orthogonality of the signals. In order to restore the orthogonality, we can use an orthogonalization process. Two of the well-known orthogonalization processes are Gram-Schmidt and Singular Value Decomposition (SVD) [14]. Both of the methods will be discussed in the following section and it will be shown that the SVD method is superior.

In FIG. 4 functions $x_0$, $x_{0,0}$, $x_{1,0}$ and $x_{1,1}$ and in FIG. 5 the functions $y_0$, $y_{0,0}$, $y_{1,0}$ and $y_{1,1}$ are shown, respectively.

3.1 Sampling and Truncation of the Signals

Since the signals are inherently band limited, determining the appropriate sampling frequency according to the Shannon's sampling theorem is not difficult. However, due to the effect of the orthogonalization algorithm (to restore the orthogonality of the signals after sampling and truncation) on the shape of the frequency spectrum of the signal, the actual bandwidth of the signals cannot be identified by the −3 dB fall-o point.

In order to find a fixed point on the spectrum of the signal to be defined as the modified bandwidth and also to have control over the maximum magnitude spectrum of the signals outside the main bandwidth, Kaiser window is employed on the sampled signals. Kaiser window is particularly useful in these cases because the power spectral density of the signals are rectangular just like the frequency response of a FIR low pass filter.

Figure 6:
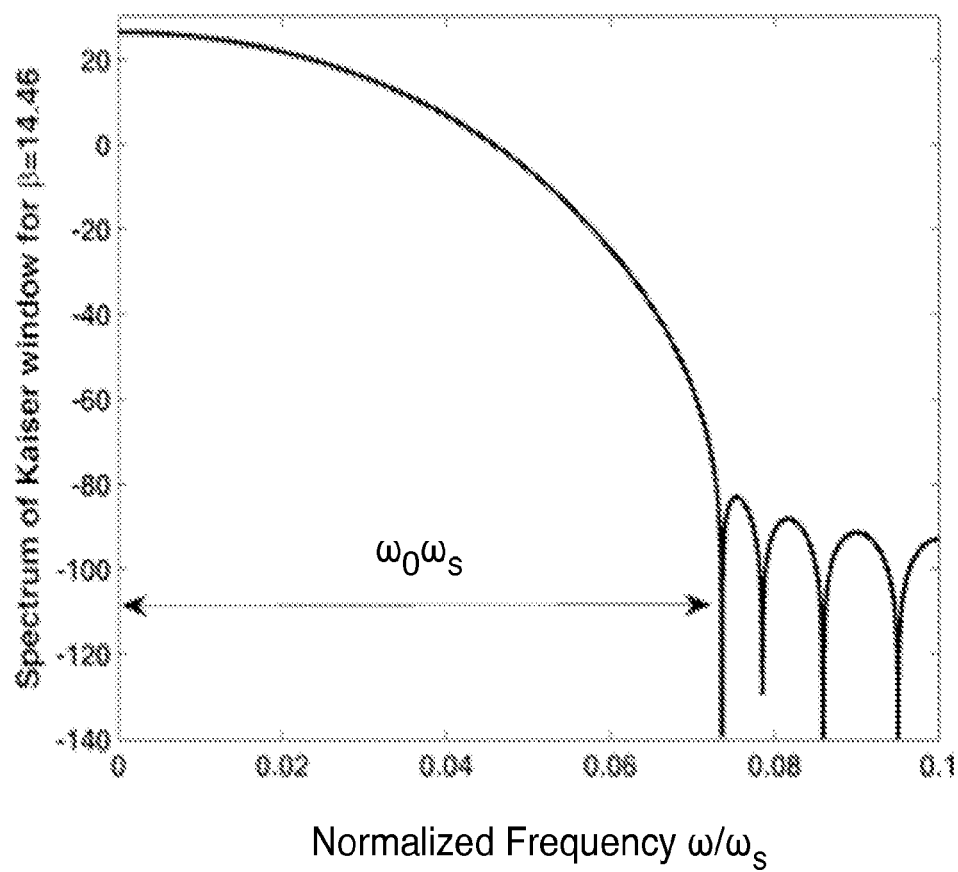
FIG. 6 is graph showing the spectrum of the Kaiser window for beta=14.46 and N=65.

To find the modified bandwidth of the signals, we can use the frequency of the first zero of the kaiser window. FIG. 6 shows the frequency ($\omega_0$). The value of $\omega_0$ can be determined by $$\omega_0 = \frac{\omega_s\sqrt{\pi^2+\beta^2}}{(N-1)\pi} \quad (39)$$

where ωs is the sampling frequency, N is the length of the window and is the parameter of the Kaiser window [15]. Now we can determine the modified bandwidth of the orthogonal signals as $$\omega_B=\omega_0+\omega_c, \quad (40)$$

where ωc is the rectangular bandwidth of the continuous time orthogonal signals defined in (35) and (36).

Using the Shannon's sampling theorem, the minimum sampling frequency is the Nyquist rate or 2ωB or $$\omega_s \geq 2\omega_B = 2\omega_0 + 2\omega_c = \frac{2\omega_s\sqrt{\pi^2+\beta^2}}{(N-1)\pi}+2\omega_c. \quad (41)$$

Therefore the minimum sampling frequency can be obtained by $$\omega_s \geq \frac{\omega_c}{\frac{1}{2}-\frac{\sqrt{\pi^2+\beta^2}}{(N-1)\pi}}. \quad (42)$$

It is worth noting that ωs must be positive or $$\frac{\sqrt{\pi^2+(0.1102(A-8.7))^2}}{(N-1)\pi} \leq \frac{1}{2}. \quad (43)$$

where A=β/0:1102+8:7 [12] is the maximum spectral magnitude of the signals outside the main bandwidth (according to the Kaiser window parameters). Since the value of N is fixed in many applications, we can solve (43) to find the upper limit of A $$A \leq 8.7+9.074\pi\sqrt{\frac{(N-1)^2}{4}-1}. \quad (44)$$

Unlike a regular sampling procedure, the higher sampling frequency does not mean the better performance. Since the number of samples N is fixed in many applications, such as communication systems, by increasing the sampling frequency, the entire portion of the signal that is to be sampled or $N \times T_s$ will be shrunk. This means that the sampled discrete time signal will contain smaller portion of the original continuous time signal. This effect will increase the chance that the sampled signals become linearly dependent hence reduction in the number of orthogonal signals after the orthogonalization process. To avoid this situation, we should select the sampling frequency as close as possible to its minimum, which is determined by (42), thus we propose the following sampling frequency $$\omega_s = \frac{1.05\omega_c}{\frac{1}{2} - \frac{\sqrt{\pi^2 + \beta^2}}{(N-1)\pi}}. \quad (45)$$

By using (45), (39) and (40) the modified bandwidth of the signals can be easily found $$\omega_B = \frac{1.05\sqrt{\pi^2 + \beta^2}\omega_c}{\frac{1}{2}(N-1)\pi - \sqrt{\pi^2 + \beta^2}} + \omega_c. \quad (46)$$

Equation (46) will allow us to find the value of we for a desired value of ωB. Then by using (45), we will be able to find the proper value of the sampling frequency ωs.

The sampling must be symmetrically performed on the continuous time signals around the origin (t=0).

Since the sample at t=0 should be included, the number of samples N must be an odd number. On the other hand, the maximum number of orthogonal discrete time signals that can be obtained in an N-dimensional vector space is N. According to (38) the number of orthogonal signals up to the $m^{th}$ order Haar function is $2^{m+2}$ so the number of samples should be $$N=M+1=2^{m+2}+1, \quad (47)$$

Referring now to FIG. 6, there is shown a spectrum of the Kaiser window for β=14.46 and N=65.

Therefore, we do not need $2^{m+2}+1$ number of signals and we can choose the number of signals up to M=N−1.

3.2 Restoring the Orthogonality of the Generated Discrete Time Signals

Sampling and truncation of the continuous time orthogonal signals will result non-orthogonal finite length discrete time signals. At this stage, the orthogonality of the discrete time signals has to be restored by using an orthogonalization procedure. The only concern is to make sure that the procedure does not change the spectral characteristics of the signals. The first choice to perform this task is considering the signals as a set of vectors and then using the Gram-Schmidt orthogonalization process, or QR decomposition [14]. This method has a disadvantage. To initiate the process, one of the signals should be considered as the first seed vector. Then each vector will be calculated to be orthogonal to the previous vector. Obviously, the final results are highly dependent to the selection of the seed vector and the order of the following vectors.

Finding the best seed vector and then determining the best order of vectors to be used in the process is a very difficult task. To overcome this problem, we can use singular value decomposition.

Figure 7:
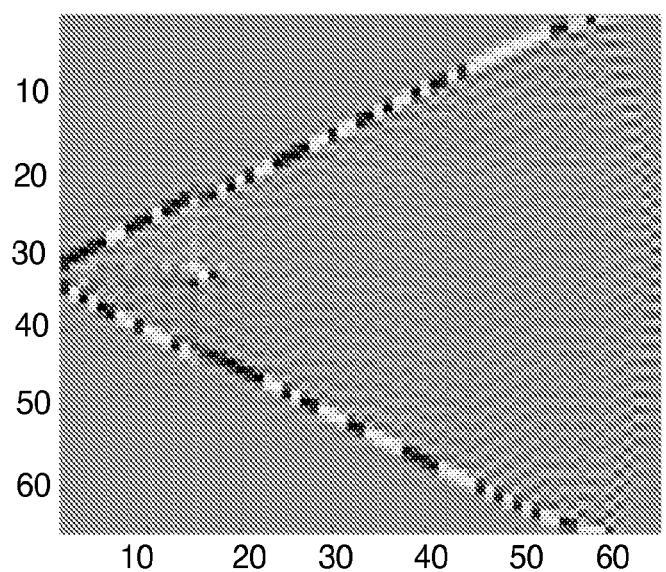
FIG. 7 is a representation of the orthogonal matrix $U_1$ obtained by singular value decomposition for N=65 and M=64.
Figure 8:
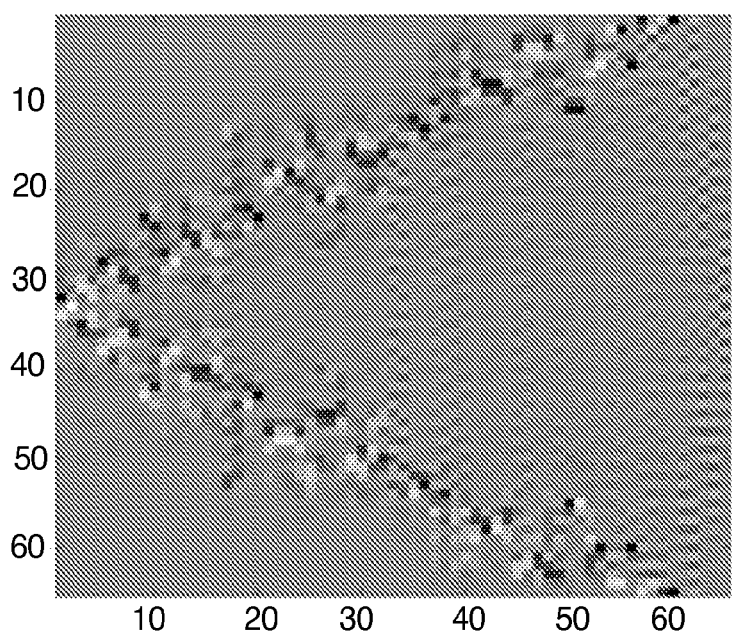
FIG. 8 is a representation of the orthogonal matrix obtained by QR decomposition for N=65 and M=64.

Let's consider that the columns of the matrix $Z \in R_{N \times M}$ are the discrete time signals where the parameters N and M are the number of samples per signal and the number of signals, respectively. According to (47) we know that N=M+1. The singular value decomposition of Z is given by $$Z=U\Delta V^T. \quad (48)$$

where $U \in R^{N \times N}$, $V \in R^{M \times M}$ and $\Delta \in R^{N \times M}$[14]. According to the singular value decomposition theory, U and $V^T$ are unitary matrices and Δ is a diagonal matrix whose diagonal values are the singular values of Z. Suppose that Rank(Z)=r≤M, then (48) can be written as $$Z = [U_1 \quad U_2] \begin{bmatrix} \Delta_1 & 0_{r \times (M-r)} \\ 0_{(N-r) \times r} & 0_{(N-r) \times (M-r)} \end{bmatrix} \begin{bmatrix} V_1^T \\ V_2^T \end{bmatrix}, \quad (49)$$

where $U_1 \in R^{N \times r}$, $U_2 \in R^{N \times (N-r)}$, $V_1 \in R^{r \times r}$, $V_2 \in R^{(M-r) \times (M-r)}$ and $\Delta_1 \in R^{r \times r}$. In (49) the matrix $U_1$ is the one that we are looking for. It contains the orthogonal vectors corresponding to the linearly independent column vectors in Z. Unlike the QR decomposition, this method does not require a seed vector and the result will be optimum. To show this fact, the matrix U1 is calculated for M=64 (m=4), thus according to (47) we have N=65. The matrix Z is calculated by the method given in the previous section and the vectors are orthogonalized by both QR and singular value decomposition methods. In the QR decomposition method, the even signals (sampled versions of (36)) are placed at the odd columns and the odd signals (sampled versions of (37)) are placed at the even columns of matrix Z. Moreover, the first even signal (the first column) is chosen as the seed vector. The resultant orthogonal matrices are depicted as two images in FIG. 7 and FIG. 8 where each pixel is an entry of the matrix and the darker pixels represent larger values (it is a negative image).

Figure 9:
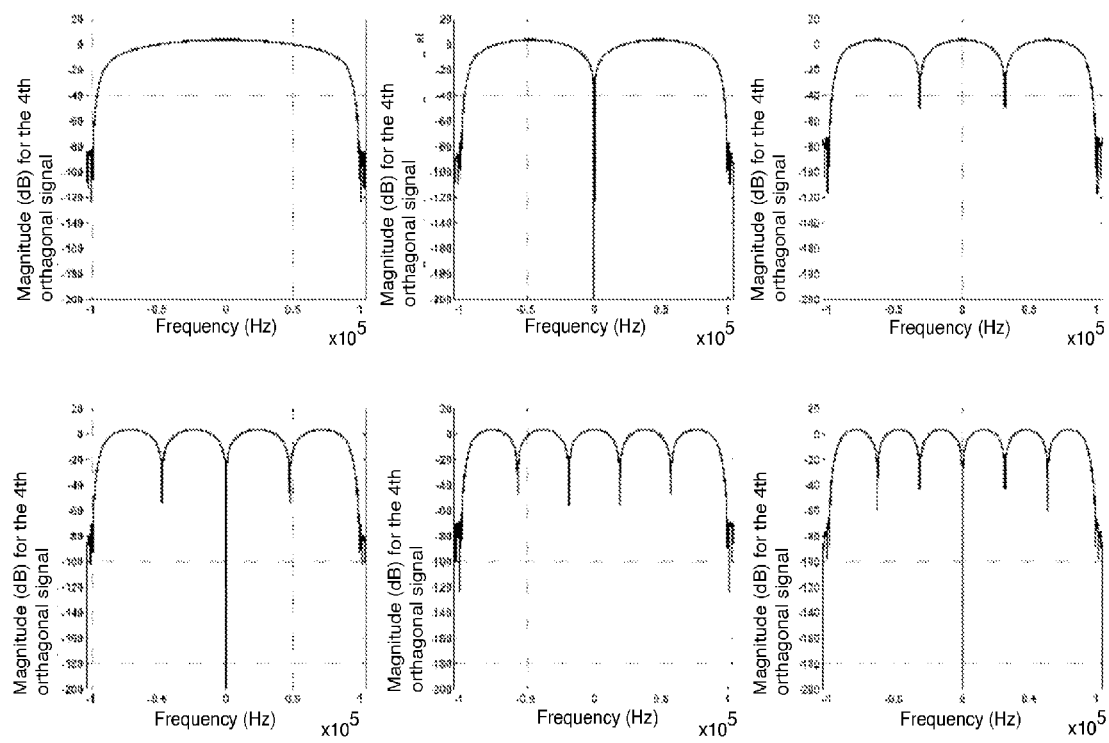
FIG. 9 is a set of six graphs showing the first six discrete orthogonal signals.
Figure 10:
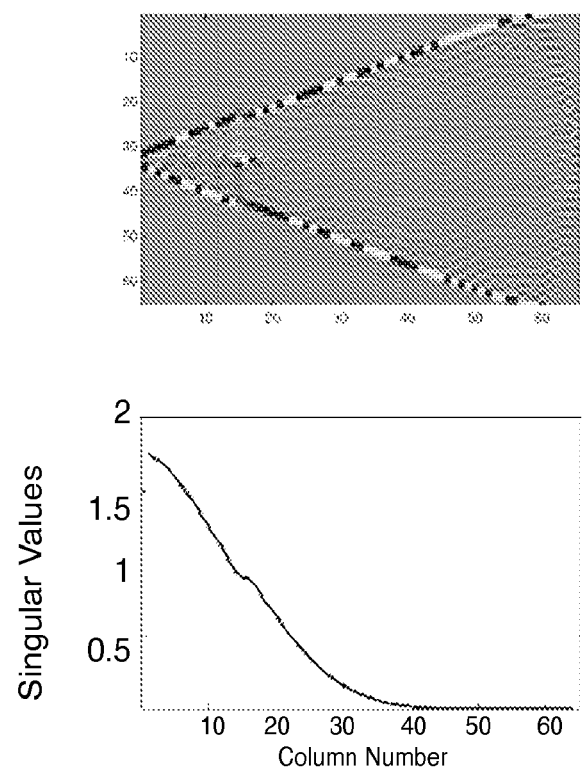
FIG. 10 is a representation and line graph of the orthogonal matrix $U_1$ obtained by singular value decomposition with the variation of the singular values.

It is obvious from the figures that the orthogonal signals (the column vectors) are symmetric and they have two extrema. Most of the energy of the signals reside between these two extrema. It is interesting to mention that the extrema are closer to each other for the signals (columns of the matrix) whose corresponding singular value is larger. FIG. 10 illustrates the variation of the singular values with respect to the column numbers. The shape of the orthogonal signals generated by the QR decomposition (FIG. 8) method is highly dependent to the arrangement of the vectors and the selection of the seed vector. Therefore, using the singular value decomposition would provide the best results. FIG. 9 illustrates the first six orthogonal signals.

Figure 11:
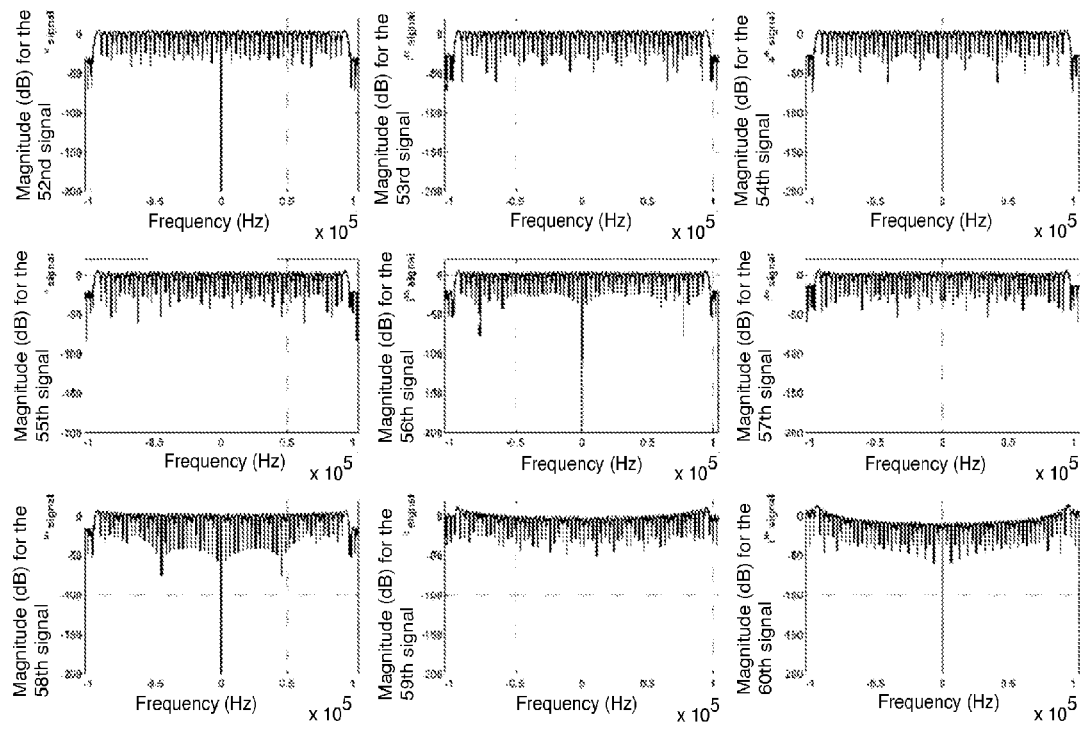
FIG. 11 is a set of 9 graphs showing the DTFT of the signals at columns 52 to 60 of the matrix $U_1$

The other important issue is the usefulness of the generated signals. FIG. 10 shows that the extrema of the signals vanish for columns above 60. Moreover, the singular values of the columns 50 and above are very small compared to the maximum singular value, which is around 1:8. If both of these factors are considered, we can conclude that the orthogonal signals (columns of the matrix $U_1$) above 52 are not useful. To show the validity of this argument, the DTFT of the signals at columns 52 to 60 are depicted in FIG. 11. Obviously, the difference between the magnitude of the spectrum inside and outside the desired bandwidth becomes smaller as their corresponding singular values is also reduced. Therefore, the orthogonal signals with small associated singular values could be disregarded based on the desired characteristics required for a particular application.

REFERENCES

[1] B. Parr, B. L. Cho, K. Wallace, and Z. Ding, "A Novel Ultra-Wideband Pulse Design Algorithm", IEEE Communication Letters, Vol. 7, No. 5, pp. 219-221, May 2003.

[2] Z. Hassan, U. Phuyal, V. Yadav, A. K. Chaturvedi, and V. K. Bhargava, "ISI-Free Pulses for High-Data Rate Ultra- Wideband Wireless Systems", Canadian Journal of Electrical and Computer Engineering, Vol. 32, No. 4, pp. 187-192, Fall 2007.

[3] A. C. Gordillo, G. T. Fertias de Abreu, and R. Kohno, "Band-Limited Frequency Efficient Orthogonal Pulse Shape Modulation for UWB Communications", International Symposium on Spread Spectrum Techniques and Applications, ISSSTA-2004, pp. 498-502, Sydney, Australia, August 2004.

[4] J. A. Ney da Silva, and M. L. R. de Campos, "Spectrally Efficient UWB Pulse Shaping With Application in Orthogonal PSM", IEEE Transactions on Communications, Vol. 55, No. 2, pp. 313-321, February 2007

[5] X. Wu, Z. Tian, T. N. Davidson, and G. B. Giannakis, "Optimal Waveform Design for UWB Radios", IEEE Transactions on Signal Processing, Vol. 54, No. 6, pp. 2009-2021, June 2006.

[6] X. Chu, and R. D. Murch, "Multidimentional Modulation for Ultra-Wideband Multiple-Access Impulse Radio in Wireless Multipath Channels", IEEE Transactions on Wireless Communications, Vol. 4, No. 5, pp. 2373-2386, September 2005.

[7] B. Hu, and N. C. Beaulieu, "Pulse Shape for Ultrawideband Communication Systems", IEEE Transactions on Wireless Communications, Vol. 4, No. 4, pp. 1789-1'79'7, July 2005.

[8] K. P. Wallace, A. B. Parr, B. L. Cho, and Z. Ding, "Performance Analysis of a Spectrally Compliant Ultra-wideband Pulse Design", IEEE Transactions on Wireless Communications, Vol. 4, No. 5, pp. 2172-2181, September 2005.

[9] W. Li, and T. A. Gulliver, "Optimal Pulse Shaping for Pulse Position Modulation UWB Systems with S parity-Driven Signal detection", The IEEE 63rd Vehicular Technology Conference, Vol. 3, pp. 1445-1458, Spring 2006.

[10] Y. Kim, B. Jong, C. Shin, and B. F. Womack, "Orthogonal Pulses for High Data Rate Communications in Indoor UWB Systems, IEEE Communications Letters, Vol. 9, No. 5, pp. 405-407, May 2005.

[11] X. Luo, L. Yang, and G. B. Giannakis, "Designing Optimal Pulse Shapers for Ultra-Wideband Radios", Journal of Communications and Networks, Vol. 5, No. 4, pp. 344-353, December 2003.

[12] M. Mandal, and A. Asif, Continuous and Discrete Time Signals and systems. Cambridge, UK: Cambridge University Press, 2007.

[13] R. E. A. C. Paley, "On Orthogonal Matrices", J. Math. Phys., Vol. 12, pp. 311-320, 1933.

[14] P. Lancaster, and M. Tismenetsky, The Theory of Matrices, Second Edition: With Applications. London, UK: Academic Press, 1985.

[15] J. F. Kaiser, and R. W. Schafer, "On the Use of the I0-Sinh Window for Expectrum Analysis", IEEE Trans. on Acoustics, Speech, and Signal Processing, Vol. 28, No. 1, pp. 105-107, February 1980.

[16] J. L. Walsh, "A Closed Set of Normal Orthogonal Functions", Amer. Jour. Math., vol. 45, pp. 5-24, 1923.

[17] N. Ahmed, H. H. Schreiber, and P. V. Lopresti, "On Notation and Definition of Terms Related to a Class of Complete Orthogonal Functions", IEEE Trans. on Electromagnetic Compatibility, vol. EMC-15, pp. 75-80, May 1973.

Applicants have also demonstrated the use of orthogonal signals (2.1) to generate Ultra-Wide Band (UWB) signals for M-ary communication scheme. The autocorrelation and spectra of these signals are shown in FIG. 7(a) and FIG. 7(b). It can be seen on FIG. 7(b) that the spectra of the signals comply with the FCC UWB indoor mask. The autocorrelation of the signals are also show that the signals are well suited for Pulse Position Modulation scheme. The obtained Bit Error Rate (BER) of the Binary PPM (2-PPM), Binary Pulse Shape Modulation (2-PSM) and Quaternary PSM (4-PSM) schemes are shown for AWGN and multi-path scenarios in FIG. 7(c) and FIG. 7(d), respectively. The BER graphs shows that the performance of the designed communications schemes utilizing the Walsh orthogonal signals are very good. Specifically incorporating the contents of U.S. provisional 61/314,142, filed 15 Mar. 2010, the contents of which are incorporated herein in their entirety, reference is made to the following claims, namely: that (1)

1. The discrete orthogonal signals generated by the method introduced in Section 2.2.

2. The new multi-tapper spectral estimation approach with the discrete orthogonal signals explained in claim 1.

3. The new shift-invariant Hilbert spaces based on the generating functions given in (2.1) that could be used to define new sampling schemes.

4. The new admissible mother wavelets derived from the even-numbered orthogonal signals in (2.1).

5. The concept of infinite-dimension multi-wavelet transform defined by using the infinite number of admissible functions given in (2.1).

6. The orthogonal signals generated by using the functions in (2.1) for M-ary UWB systems. These signals are shown in FIG. 7(a).

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

What is claimed is:

1. A method for the high fidelity transmission and reception of several orthogonal electrical pulsed signals over one allocated bandwidth within a system for generating and transmitting signals having a defined pulse shape, comprising: selecting the signals that have a rectangular shape power spectral density, wherein orthogonal function sets are found in the frequency domain, and wherein orthogonal functions are a Haar orthogonal function set, and restoring orthogonality after truncation or sampling using a Singular Value Decomposition (SVD) orthogonalization process, wherein the orthogonal function for $\omega c$ is described by $$x_{m,k}(t) = \frac{\omega_c}{\pi 2^m} \operatorname{sinc}\left(\frac{\omega_c t}{\pi 2^{m+2}}\right) \sin\left(\frac{\omega_c t}{2^{m+2}}\right) \sum_{n=0}^{2^m-1} \alpha_{m,n,k} \sin\left(\frac{\left(n+\frac{1}{2}\right)\omega_c t}{2^m}\right) \quad (35)$$

and

-continued $$y_{m,k}(t) = \frac{\omega_c}{\pi 2^m} \mathrm{sinc}\left(\frac{\omega_c t}{\pi 2^{m+2}}\right)\sin\left(\frac{\omega_c t}{2^{m+2}}\right)\sum_{n=0}^{2^m-1} \alpha_{m,n,k}\cos\left(\frac{\left(n+\frac{1}{2}\right)\omega_c t}{2^m}\right), \quad (36)$$

where k=0, 2, ..., 2m−1 and m=0, 1, 2, ...,
wherein $x_{m,k}(t)$ is the total number of odd signals and $y_{m,k}(t)$ is the total number of even signals,
wherein $\omega_c$ is the rectangular bandwidth of the continuous time orthogonal signals,
wherein $\pi 2^m$ and $\pi 2^{m+2}$ are constants,
wherein sinc is a normalized cardinal sine function $\mathrm{sinc}(x) = \sin(\pi x)/\pi x$,
wherein $\omega_c(t)$ is bandwidth multiplied by time,
wherein $\alpha_{m,n,k}$ belongs to set {−1, +1}, and
n and m are variables in summation Σ.

2. The method of claim 1, further comprising wherein the pulsed signals are signals of an ultra wideband type.

3. The method of claim 1, further comprising wherein the pulsed signals are signals of an orthogonal frequency division multiplexing (OFDM) communication system.

4. The method of claim 1, further comprising wherein the pulsed signals are used in a jitter-free digital communication system.

5. A communication device for assisting the high fidelity transmission and reception of several orthogonal electrical pulsed signals over one allocated bandwidth, comprising: a generator apparatus for generating and transmitting signals that have a rectangular shape power spectral density, wherein orthogonal function sets are found in the frequency domain, and wherein orthogonal functions are a Haar orthogonal function set, and where a Singular Value Decomposition (SVD) orthogonalization process is used to restore orthogonality after truncation or sampling,
wherein the orthogonal function for ωc is described by $$x_{m,k}(t) = \frac{\omega_c}{\pi 2^m} \mathrm{sinc}\left(\frac{\omega_c t}{\pi 2^{m+2}}\right)\sin\left(\frac{\omega_c t}{2^{m+2}}\right)\sum_{n=0}^{2^m-1} \alpha_{m,n,k}\sin\left(\frac{\left(n+\frac{1}{2}\right)\omega_c t}{2^m}\right) \quad (35)$$

and $$y_{m,k}(t) = \frac{\omega_c}{\pi 2^m} \mathrm{sinc}\left(\frac{\omega_c t}{\pi 2^{m+2}}\right)\sin\left(\frac{\omega_c t}{2^{m+2}}\right)\sum_{n=0}^{2^m-1} \alpha_{m,n,k}\cos\left(\frac{\left(n+\frac{1}{2}\right)\omega_c t}{2^m}\right), \quad (36)$$

where k=0, 2, ..., 2m−1 and m=0, 1, 2, ...,
wherein $X_{m,k}(t)$ is the total number of odd signals and $y_{m,k}(t)$ is the total number of even signals,
wherein $\omega_c$ is the rectangular bandwidth of the continuous time orthogonal signals,
wherein $\pi 2^m$ and $\pi 2^{m+2}$ are constants,
wherein sinc is a normalized cardinal sine function $\mathrm{sinc}(x) = \sin(\pi x)/\pi x$,
wherein $\omega_c(t)$ is bandwidth multiplied by time,
wherein $\alpha_{m,n,k}$ belongs to set {−1, +1}, and
n and m are variables in summation Σ.

6. The device of claim 5, further comprising wherein the pulsed signals are signals of an ultra wideband type.

7. The device of claim 5, further comprising wherein the pulsed signals are signals of an orthogonal frequency division multiplexing (OFDM) communication system.

8. The device of claim 5, further comprising wherein the pulsed signals are used in a jitter-free digital communication system.

* * * * *